Aug. 4, 1964
W. A. ALEXANDER
3,143,055
SEISMIC SECTION CORRECTION DEVICE
Filed Aug. 22, 1960
2 Sheets-Sheet 1
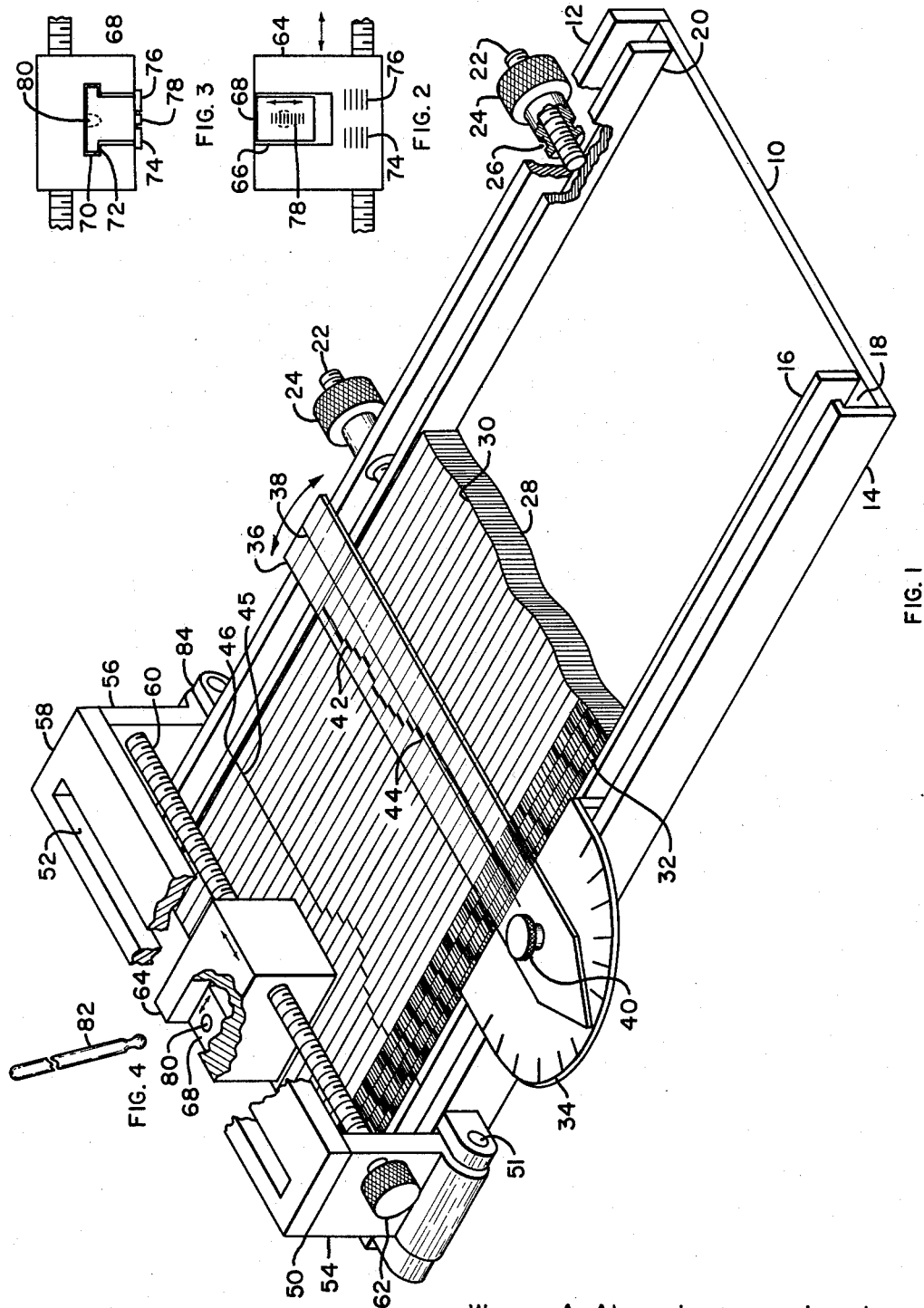
Warren A. Alexander   Inventor
By John D. Gassett    Attorney

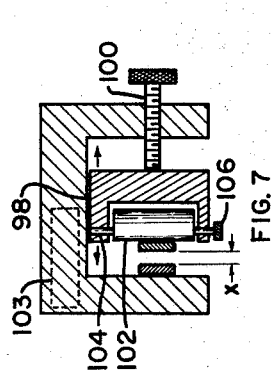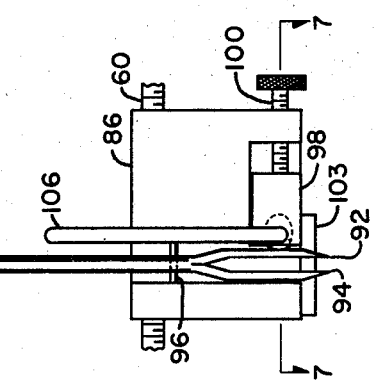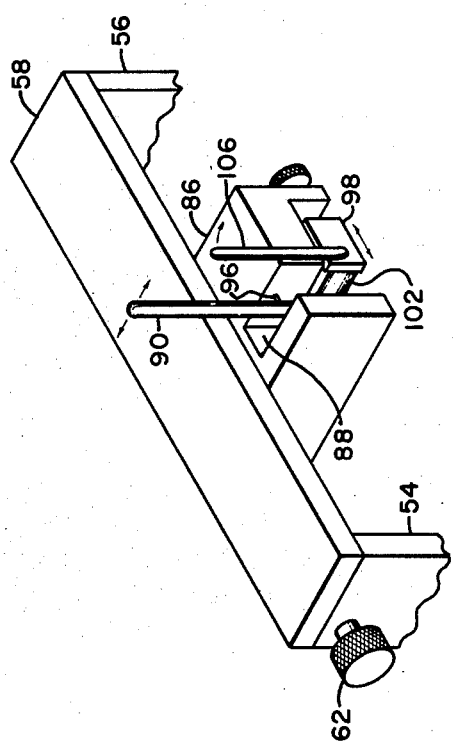

United States Patent Office 3,143,055
Patented Aug. 4, 1964

3,143,055
SEISMIC SECTION CORRECTION DEVICE
Warren A. Alexander, Tulsa, Okla., assignor to Jersey Production Research Company, a corporation of Delaware
Filed Aug. 22, 1960, Ser. No. 51,015
10 Claims. (Cl. 95—73)

The present invention concerns seismic records. It especially pertains to a system for presenting seismic data in which corrections for individual traces are introduced in a novel manner.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. The waves travel downwardly within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated to electrical impulses which are then indicative of the character of the ground motion and are usually referred to collectively as a seismic signal which is in effect a composite signal made up of a plurality of electrical signals varying in frequency and amplitude.

The usual practice has been to examine the characteristics of the recording made of the seismic signal by correlating a plurality of traces on a seismic record. Seismic observers can, by observing such traces, determine the shape of reflected subsurface formations. By accurately recording the time required for the seismic waves to travel to the reflection surfaces and return to the geophones, it is possible to determine the depths to such reflection surfaces. In the past, it has been the general practice to amplify the seismic signals generated by geophones and to record the signal by means of a suitable camera. The camera may take the form of recording oscillograph or as is more recently the case, it may take the form of a magnetic or photographic recording device capable of recording the signal in reproducible form. It is this amplified record signal with which seismic computers make their study.

Most conventional seismographs; that is, devices for recording the seismic signals, are capable of recording up to 24 or more separate seismic signals simultaneously. Thus, if a seismic observation results in 24 seismic signals being generated at as many detection stations, the resulting seismogram is a 24 trace record of the resulting 24 signals. These traces are usually arranged in a side-by-side relationship and a timing trace indicating predetermined time intervals is simultaneously recorded with the seismic signals to indicate the elapsed time after the shot to any point on each trace. The records thus obtained when mounted side by side are commonly referred to as a seismic section. The sections are analyzed and it has been possible to learn a great deal about the earth structure through their use.

The accuracy of exploration by seismic methods depend to a large extent upon the ability of an observer to analyze recorded seismic information. Variable density setcion presentation has become especially popular as an aid to the seismic observer. In variable density presentation the signal is reproduced as a photographic trace which varies in density along its length in proportion to the intensity of the signal. This affords a very striking and accurate vertical cross-section or profile reproduction in a portion of the earth under study.

Regardless of the type seismic section produced, they are normally corrected for static and for dynamic errors. The so-called "static" corrections are introduced to compensate for such things as the height of the geophone relative to an assumed datum plane, the velocity of the waves through a low velocity layer immediately adjacent the earth, the elevation of the disturbance or the shock points relative to the datum plane, etc. The second type of correction that is normally made to seismic records is the so-called "dynamic" or "variable" type in that the magnitude of the correction varies with the time for the signals that are received by any given geophone or transducer location. That category of correction includes "spread" or "step-out" correction which is a function of the distance of the geophone location from the shock point. It also includes any correction that is occasioned by variation in seismic velocity with depth in the section of earth under study.

Seismic corrections as noted above are calculated by various means and are incorporated into the seismic section or seismogram. However, the earth is quite complex in structure and no known means have been established whereby such corrections are absolute. When such corrections are applied to a seismic section they are, of course, quite helpful but nearly always one or more of the traces of the seismic section is not in its proper position relative to the seismic sections as a whole. When traces are out of position, it complicates and makes more difficult the analysis of the seismic section. It is an object of the present invention to produce a seismic section in which the individual traces can be adjusted relative to the others while the section is under observation.

Briefly, in a preferred embodiment, the invention pertains to a system for making corrections to a seismic section composed of side-by-side traces. A plurality of elongated strips are provided in which the thickness of the strip is equal to or less than the width of the trace of the seismic section. The surface of the edge of each strip is of a character upon which an image can be produced. A frame is provided for holding the strips in parallel relationship such that the edges of the strips form a surface upon which an image of the section can be produced. Means are provided for moving the strips relative to each other. The individual traces are then adjusted as desired to aid in analyzing the section being considered. The individual traces are moved while the movement is being observed, and the new correlation of the trace with the rest of the traces is also being observed. Usual methods employ magnetic tape or photographic process or both in which the effect of each correction can be observed only after considerable processing and a photographic developing step has been carried out for example.

Other objects and a more complete understanding of the invention may be had from the following description taken in conjunction with the drawing in which:

FIG. 1 is a perspective view of a preferred embodiment of the invention;

FIG. 2 illustrates a bottom view of the trace positioning device or transverse box of FIG. 1;

FIG. 3 is a back view of the trace moving device illustrated in FIG. 1;

FIG. 4 is a rod for use with the device illustrated in FIG. 1;

FIG. 5 illustrates a perspective view of another means of moving one or more traces with respect to the other traces of the seismic section;

FIG. 6 is a front view of a portion of the device shown in FIG. 5; and

FIG. 7 is a partial section view taken along the line 7—7 of FIG. 6.

Referring to the drawing and FIG. 1 in particular, there is illustrated the best mode contemplated for carrying out the invention. It includes a bottom plate 10. Affixed to plate 10 are upright elongated members 12 and 14 on opposite sides of plate 10. Spaced from upright member 14 and also affixed to plate 10 is another upright elongated member 16. A slide way or slot 18 is formed between upright members 14 and 16.

A fourth upright member 20 is spaced from upright member 12 and its spaced distance is adjustable. Bolts 22 are affixed to upright member 20 and extend through upright member 12. Knurl nut members 24 having internal threads to match those of bolts 22 are mounted on bolts 22. Groove 26 of nut 24 is designed to rotatably fit within a hole in upright member 12. It is thus seen that counter-clockwise rotation of nut 24 moves upright member 20 farther from upright member 12 and likewise clockwise rotation of nut 24 moves upright member 20 closer to upright member 12. There are shown two bolts 22 and two nuts 24; however, this number can be varied as may be desired.

Mounted between upright members 16 and 20 are a plurality of narrow elongated strips 28. The upper edge 30 of each elongated strip 28 is of a character to receive an image thereon. The upper edges 30 of elongated strips 28 form a surface upon which a seismic section is produced. The upper edges 30 of elongated strips 28 are treated such as by applying luminous paint or photographic film thereto or the like so that an image may be produced thereon.

The elongated strips may be metal such as aluminum or may be paper. However, it has been found that the best material for strips 28 are cut from cardboard that is white completely through. A preferred size of the strips is ⅞ inch by 14 inches, but of course, the length can be increased to suit most section lengths. The strips, in a preferred embodiment, have a thickness of about 0.012 inch. This means that about 83 strips will be used per inch of section width. An 8 record section each recording having 24 traces, for example, which would run about six inches in width, would required about 500 strips of paper. The thickness of the paper strips can be selected to suit the seismic section being processed. For example, if the section has a trace width of .036 inch which is common, a strip of paper .012 inch thick would be suitable. The trace then would cover three strips of paper. As shown in the drawing, three strips 28 make up one trace 32. If in the example given in this paragraph a trace had a width of .042 inch, then that trace would cover 3½ strips that were .012 inch thick. The image on the edge of each fourth paper strip would be made up from two adjoining traces. However, this would not be any serious handicap as the positions would tend to blend together and an occasional narrow strip would not hinder the analysis.

Although various processes can be used to treat the edges of the elongated strips 28 to make them capable of receiving an image thereon, it has been found that the use of sensitizing cardboard strips is quite satisfactory. Especially suitable sensitizing material is Copyflex Sensitizing Salt sold by the Charles Bruning Company, Inc., of Mount Prospect, Illinois. After the cardboard strips have been placed in the frame in a manner to obtain a smooth even grid surface, a uniform coating of a sensitizing solution using the Copyflex Salt is applied to the upper edges of the cardboard strips. After the grid is well dried it is ready to be exposed to a variable density film seismic section which is to be analyzed. The film section of the seismic section is aligned with the traces on the film parallel to the cardboard strips. The surface of the cardboard strips is then exposed. After proper exposure, the grid or surface of the strips are then developed. This produces an image of the seismic section on the edges 30.

Slidably mounted in slot 18 is protractor 34 with transparent arm 36 pivotally mounted on protractor 34. Transparent arm 36 has an aligning line 38 thereon. Transparent arm 36 is also adjustable and may be set at any desired angle by nut 40.

The surface formed by the edges of the strips 28 in FIG. 1 is illustrated as having a variable density section image produced thereon. However, for clarity only the first four traces from the left have the variable density section shown thereon. However, an event indicated by the partially broken line 42 is shown crossing the section. It is assumed that it is desired to correct the seismic section such that line 42 is aligned with line 38 on protractor extension arm 36. The first portion of line 42 is shown as having been corrected to point 44 leaving the remainder of the line to be corrected. The correction is easily accomplished by longitudinally moving strips 28. To accomplish this, the strips 28 to the right of point 44 are then moved longitudinally until the events forming line 42 are aligned with line 38. After the strips have been adjusted as desired, nuts 24 are rotated counter-clockwise, thus tightening the strips 28 so as to hold them firmly. The seismic section thus corrected may be observed directly from the surface of the edges of strips 28 or the section may be photographed and reproduced.

Before the strips are moved, it is preferred to carefully draw a zero reference line 45 across one end of the section so that it is aligned with the pair of reference strip marks 46 on the sides of the frame. This provides a datum line so that the amount of correction made can be determined.

After the desired adjustments have been made, the seismic section thus corrected can be studied directly or the section may be photographed. Alternatively the values of the new corrections may be determined by taking the difference between the adjusted segments of the original zero reference line and the new zero correction line drawn on the section between reference marks 46 on the frame. The correction thus determined may be used in reproducing seismic sections from a reproducible medium such as magnetic tape.

The system disclosed herein is also very useful in the process called "hanging" or seismic isopacking, where the relative position of two or more dipping events is important. The various traces are adjusted longitudinally so that one of the dipping events becomes horizontal. Then by observing the first dipping event with the second dipping event the separation therebetween is much more easily seen than on a conventional seismic section from which such separation is difficult to ascertain.

Attention will now be directed at means for moving the traces longitudinally with respect to each other. Shown in FIG. 1 is supporting frame 50 connected at pivot 51 to upright member 14. Supporting frame 50 has upright member 54 and upright member 56 and a top member 58. Mounted in and extending between end members 54 and 56 is lead screw 60. Lead screw 60 may conveniently be rotated by knurlled knob 62. The upper portion 58 of supporting frame 50 has a lateral slot 52 therethrough.

Mounted on lead screw 60 is transverse traveling box

64. Traveling box 64 has internal threads such that rotation of lead screw 60 moves traveling box 64 laterally across the section. FIG. 2 gives a bottom view of traveling box 64 which is seen to be U-shaped, more or less. Mounted in opening 66 of box 64 is sliding longitudinal block 68. As seen more clearly in FIG. 3 the upper portion of opening 66 has a recessed section 70 for receiving shoulders 72 of sliding block 68. The movement of block 68 with respect to box 64 may vary as desired. However, it has been found that a travel of approximately ¼ of an inch is usually satisfactory.

Mounted on the bottom side of traveling box 64 as shown in FIG. 2 and FIG. 3 are spaced grippers 74 and 76. Mounted on longitudinal sliding block 68 are grippers 78. Grippers 78, 74, and 76 are so aligned that grippers 78 are aligned with the space between grippers 74 and 76. The width of grippers 78 should be the approximate width of the smallest number of strips 28 which is desired to be moved at a single time. The space between grippers 74 and 76 should be approximately the same width as the width of gripper 78. The grippers may be conveniently made from razor blades which have been fixed in a side-by-side relationship and are otherwise cut to the desired size. A hole 80 is provided in sliding block 68.

A lever 82 similar as shown in FIG. 4 is conveinently used to move sliding block 68. The ball end of lever 82 is inserted in hole 80 through slot 52. In operation, grippers 78 are aligned with those trace or traces desired to be moved longitudinally in the seismic section by the rotating of the knob 62. When gripper 78 is aligned properly, supporting frame 50 is then held firmly downward as by clamp 84 thus forcing the grippers into firm contact with the upper surface of the seismic section composed of the edges 30 of strips 28. Lever 82 is then inserted through slot 52 into hole 80. Lever 82 is then moved using one edge of slot 52 as a fulcrum to move sliding block 68 and grippers 78 a desired distance to effect the correction of the trace being corrected.

Attention is now directed toward FIGS. 5, 6, and 7 which show another means for moving strips 28 with respect to adjacent strips. Shown supported from lead screw 60 is another traveling box 86. Box 86 has a vertical slot 88 therein in which is mounted a tweezer-like element 90, having tweezer points 92 and 94 at the lower end thereof. Tweezer element 90 is supported about pivot 96. Traveling yoke 98 is adjustable by adjusting screw 100. Adjusting screw 100 is used to adjust the distance X between points 92 and 94 to the width of the trace 30 to be moved. Mounted within yoke 98 is cam 102 affixed to shaft 104. Affixed to shaft 104 is tightening lever 106. Movement of lever 106 to the right forces tweezer tip 94 toward tip 92.

It is believed that the operation of the device shown in FIGURES 5, 6, and 7 is obvious. However, a brief discussion will be given. With lever 106 in upright position as shown in FIG. 6, a distance between tips 92 and 94 of tweezer element 90 is adjusted by adjusting screw 100 to the width of the strips desired to be moved on the seismic section. Tweezer tips 92 and 94 are then inserted between the strips 28 as may be desired. Lever 106 is then rotated to the right moving cam 102 against the arm of lever 90 thus tending to force tips 92 and 94 together. Before tips 92 and 94 are forced between strips 28, a gripping element 103 is forced downwardly against the edges of the strips 28. Gripping element 103 may conveniently be rubber such as found in an ordinary rubber eraser. After tips 92 and 94 have been forced toward each other, longitudinal adjustment of the strips between the tips 92 and 94 is accomplished by rotating tweezer element 90 about pivot 96 as may be required to effect the desired correction. The gripping element 103 will hold adjacent strips between tips 92 and 94 but the strips held by tweezer element 90 will slide relative to the other strips.

While there are above disclosed but a limited number of the embodiments of the structure and system of the invention herein presented, it is possible to produce still other embodiments without departing from the inventive concept herein disclosed. It is therefore desired that only such limitations be imposed on the appending claims as are stated therein or required by the prior art.

What is claimed is:

1. An apparatus for use in making corrections to a seismic section composed of side-by-side traces each of narrow width in relation to its length which comprises in combination: a plurality of elongated strips, each strip having a narrow edge not greater in width than the width of a trace of said seismic section, the surface of the edge of each strip being of a character upon which an image can be produced; and a frame for holding said strips in a parallel relationship such that the edges of said strips form a surface upon which the image of said section can be produced.

2. An apparatus as defined in claim 1 including means for moving said strips relative to each other.

3. An apparatus as defined in claim 2 in which the means for moving said strips relative to each other include two spaced-apart grippers of a character to grip the edges of said strips of paper to hold them stationary and a third gripper of a character to grip said edges and said third gripper being of a further character to move relative to said first two grippers in a line between said first two grippers.

4. An apparatus as defined in claim 2 in which the means for moving said strips relative to each other include a tweezer with spaced-apart tips; and means to hold the strips adjacent said tweezer tips.

5. An apparatus as defined in claim 1 in which the edges of said strips have been painted with a luminous paint.

6. An apparatus as defined in claim 1 in which the edges of said strips have been sensitized with a sensitizing salt.

7. An apparatus for use in making corrections to a seismic section composed of side-by-side traces which comprises in combination: a plurality of elongated strips, each strip having a narrow edge not greater than the width of a trace of said seismic section; the surface of the edge of each strip being of a character upon which an image can be produced; a frame for holding said strips in a parallel relationship such that the edges of said strips form a surface upon which an image of said section can be produced; means to compress and release said elongated strips within said frame; a supporting carriage having two parallel end members and a top member connecting said end members and said top member having a slot lateral to said strips and said frame; pivot means between one end of said supporting carriage and the side of said frame; clamping means to clamp the other end of said supporting carriage to the opposite side of said frame; a lead screw extending from one end member to the other end member of said supporting carriage; a transverse traveling box supported upon said lead screw; said transverse traveling box having a pair of gripping elements on its lower side with a space therebetween parallel to the edges of said strips; a rectangular opening in the bottom of said traveling box and a sliding block within said opening; gripping means on the bottom of said sliding block aligned with the space between the grippers on the bottom of said tarveling box; and means to move said sliding block within said opening.

8. An apparatus as defined in claim 7 in which said means for moving said sliding block include a hole in the upper side of said sliding block and a lever insertable through said slot to said hole.

9. An apparatus for use in making corrections to a seismic section composed of side-by-side traces each of narrow width in relation to its length which comprises in combination: a plurality of elongated side-by-side strips, each strip, being in frictional engagement with its adjacent strip, each strip having a narrow edge not greater in width than the width of the trace of said seismic section, the surface of the edge of each strip being of a character upon which an image of the trace of the seismic section can be produced; and a frame for holding said strips in such parallel side-by-side relationship so as to form a surface.

10. A method of preparing a seismic section composed of side-by-side traces upon a plurality of parallel strips, the edge of each said strip being not greater in width than the width of the trace of said section which comprises in combination: arranging the edges of such strips to form a surface; preparing such surface to be image sensitive; aligning the traces of the seismic section with the edges of the strips; and thereafter exposing the said surface to produce an image of the seismic section on such surface.

References Cited in the file of this patent
UNITED STATES PATENTS 2,977,680     Halverson _____ Apr. 4, 1961

FOREIGN PATENTS 2,714     Great Britain _____ of 1899